United States Patent
Aubin-Marchand

(10) Patent No.: US 10,480,628 B2
(45) Date of Patent: Nov. 19, 2019

(54) ELECTRIC ACTUATOR

(71) Applicant: Soucy International Inc, Drummondville, Quebec (CA)

(72) Inventor: Jeremie Aubin-Marchand, St-Hugues (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 410 days.

(21) Appl. No.: 15/290,887

(22) Filed: Oct. 11, 2016

(65) Prior Publication Data

US 2017/0102057 A1  Apr. 13, 2017

Related U.S. Application Data

(60) Provisional application No. 62/239,129, filed on Oct. 8, 2015.

(51) Int. Cl.
| | |
|---|---|
| *F16H 25/20* | (2006.01) |
| *F16H 25/22* | (2006.01) |
| *H02K 7/06* | (2006.01) |
| *H02K 7/116* | (2006.01) |

(52) U.S. Cl.
CPC ......... *F16H 25/20* (2013.01); *F16H 25/2204* (2013.01); *H02K 7/06* (2013.01); *H02K 7/116* (2013.01); *F16H 2025/204* (2013.01); *F16H 2025/2037* (2013.01); *F16H 2025/2078* (2013.01); *F16H 2025/2081* (2013.01)

(58) Field of Classification Search
CPC ....... F16H 25/20; F16H 25/2204; H02K 7/06; H02K 7/116
See application file for complete search history.

(56) References Cited

U.S. PATENT DOCUMENTS

| | | | |
|---|---|---|---|
| 10,150,459 B2* | 12/2018 | Weh | F04B 9/02 |
| 2013/0169088 A1* | 7/2013 | Wu | H02K 7/102 |
| | | | 310/77 |
| 2014/0150580 A1* | 6/2014 | McEntee | F16H 25/2233 |
| | | | 74/89.34 |
| 2015/0007675 A1* | 1/2015 | Drennen | F16H 25/2204 |
| | | | 74/89.23 |
| 2015/0040702 A1* | 2/2015 | Bochen | F16F 9/54 |
| | | | 74/89.23 |
| 2015/0047443 A1* | 2/2015 | Tseng | F16H 25/2056 |
| | | | 74/89.23 |
| 2015/0155757 A1* | 6/2015 | Hidaka | H02K 7/102 |
| | | | 310/77 |

(Continued)

*Primary Examiner* — Zakaria Elahmadi
(74) *Attorney, Agent, or Firm* — BCF LLP

(57) ABSTRACT

An electric actuator to be primarily used on an all-terrain vehicle (ATV) having implements such as snow plow is disclosed. The main purpose of the actuator is to allow the driver to rotate the blade when it is not touching the ground without having to get out of the vehicle. The actuator is composed of a stator assembly and a motor assembly. An electric motor is concealed in the motor assembly and drives a screwed or grooved part that engages the threaded or grooved inner surface of the stator assembly. Rotation of the screwed or grooved part induces a translational movement alongside the longitudinal axis of the actuator assembly. The translation movement induces the elongation or the retraction of the actuator depending on the rotating direction of the electric motor.

6 Claims, 17 Drawing Sheets

(56) References Cited

U.S. PATENT DOCUMENTS

| | | | |
|---|---|---|---|
| 2015/0171702 A1* | 6/2015 | Matsuda | F16D 23/14 |
| | | | 310/68 B |
| 2015/0295468 A1* | 10/2015 | Pizzoni | F16H 25/20 |
| | | | 310/80 |
| 2015/0322931 A1* | 11/2015 | Weh | B60T 8/4018 |
| | | | 417/415 |
| 2015/0377330 A1* | 12/2015 | Mori | F16H 25/2214 |
| | | | 74/89.44 |
| 2016/0025199 A1* | 1/2016 | Boone | F16H 25/2204 |
| | | | 74/89.38 |
| 2016/0108911 A1* | 4/2016 | Sprocq | F04C 2/084 |
| | | | 418/205 |
| 2016/0146318 A1* | 5/2016 | Trybula | F16H 25/186 |
| | | | 74/89.35 |
| 2017/0271947 A1* | 9/2017 | Ando | B65H 18/10 |

\* cited by examiner

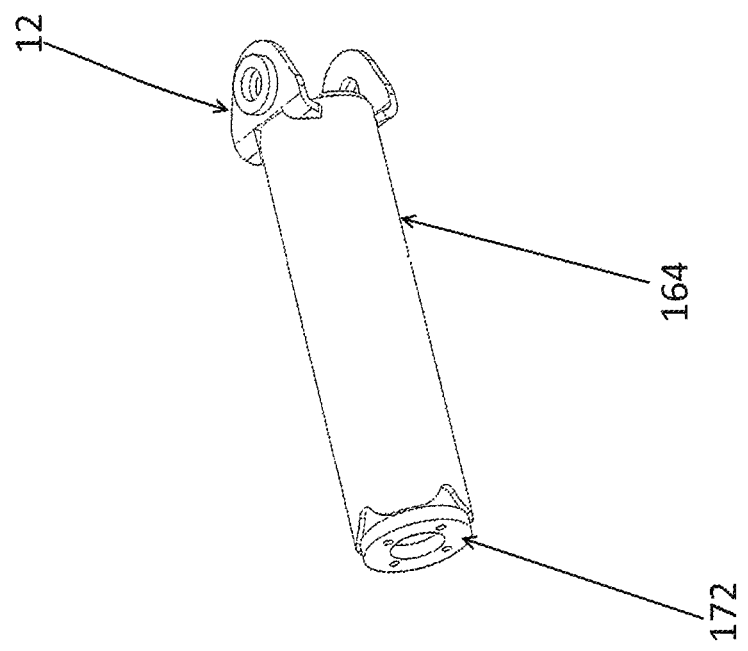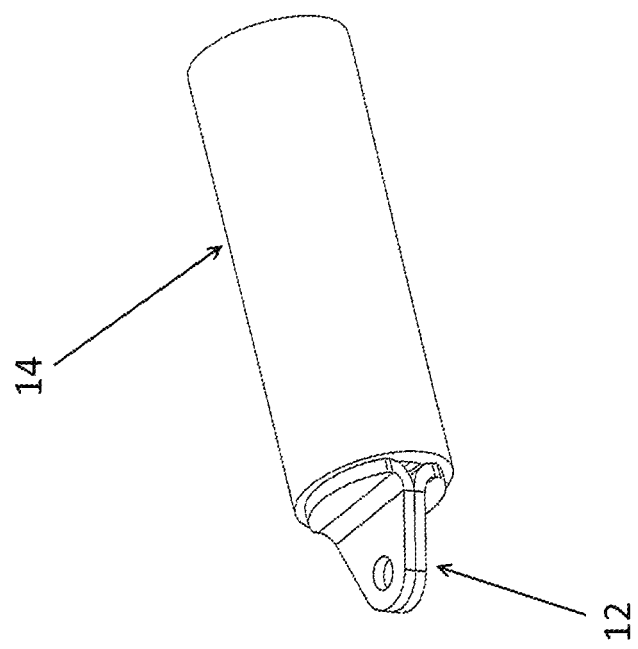
FIG. 7

ELECTRIC ACTUATOR

CROSS-REFERENCE TO RELATED APPLICATIONS

The present patent application claims the benefits of priority of U.S. Provisional Patent Application No. 62/239,129, entitled "ELECTRIC ACTUATOR", and filed at the United States Patent and Trademark Office on Oct. 8, 2016, the content of which is incorporated herein by reference.

FIELD OF THE INVENTION

The present invention generally relates to electric actuators. More specifically, the present invention relates to electric actuators for moving implement attached to a vehicle.

BACKGROUND OF THE INVENTION

All-terrain vehicles ("ATV" or "ATVs"), utility-terrain vehicle ("UTV" or "UTVs"), and other similar vehicles, are often equipped with implements such as plows (or plough in English spelling) to allow the vehicles to displace any type of elements or objects, such as snow, dirt, soil, gravel, etc. Such implements are typically removably mounted to the vehicles via appropriate supporting frames or supporting frame assemblies. Such implements are typically pivoting in order to change the angle of the implement to angularly push elements. In order to pivot an implement, typical systems on the market use hydraulic actuator. Such configurations are very expensive. These systems are typically bulky and support high loads.

Thus, it is believed that there is a need for a new low cost system using an reduced size actuator, typically an electric actuator, to angularly turn the implement, wherein such system could comprise a mechanism to automatically trigger the turning of the implement while being user-friendly and by limiting the need of an operator to disembark from the vehicle to activate the system. Such system shall aim at having dimensions allowing to fit the actuator in current plow systems originally designed to use typical hydraulic actuators. Furthermore, a vehicle having an implement is expected to hit obstacles. Thus, the actuator shall aim at providing a very high static/impact load resistance. Such load shall be higher than what the electric motor can withstand.

SUMMARY OF THE INVENTION

It is disclosed a fully electric actuator assembly to be used to rotate an implement such as the shovel of a snow remover.

It is disclosed an electric actuator composed of two main parts, preferably cylindrical, of different size or diameter such that a smaller part, herein below referred to as a motor assembly, is able to fit inside a larger part, herein below referred to as the stator assembly. The inside wall of the stator assembly being shaped in a way to be either directly engaged by a moving counterpart, preferably attached to the motor assembly, or engaged by rolling balls configured to move inside an externally grooved part. The grooved part is either a modified part of the moving counterpart or an additional part attached to the side of the moving counterpart, facing the inner part of the stator assembly. The moving counterpart is typically activated by the drive shaft of an electric motor. The electric motor may be coupled to a gearbox to increase the torque. Rotation of the moving counterpart induces either an immediate translational movement alongside the longitudinal axis of the actuator assembly or a rotational movement of the rolling balls inside the grooved part which induces a translational movement alongside the longitudinal axis of the actuator. The translational movement induces the elongation or the retraction of the actuator.

According to a preferred embodiment, an electric actuator or a system to change the orientation of an implement is disclosed.

In one aspect of the invention, an electric actuator is adapted to change the orientation of an implement. The actuator comprises a mobile assembly, an electric motor connected to the mobile assembly and an engaging mean for attaching the actuator to an implement at one end of the assembly. The mobile assembly engaging the engaging mean is adapted to rotate and is configured to translate the rotational movement of the mobile assembly into a longitudinal movement along a longitudinal axis of the actuator In another aspect of the invention, the mobile assembly may comprise a mobile counterpart coupled, at one side, to a sleeve by at least one attachment mean. The sleeve is coupled to an electric motor with a drive shaft. The mobile assembly further comprises a plate trapped between the mobile counterpart and the sleeve. The plate is being attached to a second end of the actuator by at least one attachment mean.

In one aspect of the invention, the mobile counterpart is adapted to engage the engaging mean with at least two communicating threaded parts.

In another aspect of the invention, the mobile counterpart may be adapted to engage the engaging mean with a grooved interior wall communicating with a grooved counterpart by the mean of rolling balls.

In a further aspect of the invention, the mobile counterpart may be adapted to engage the engaging mean with at least two communicating threaded parts and the movement of the rolling balls inside a grooved insert supported by the counterpart. The insert is adapted to receive a reduced friction mechanism.

In another aspect of the invention, the sleeve and the mobile counterpart may be adapted to independently rotate from one end of the actuator about a longitudinal axis of the actuator. The sleeve may further comprise an aperture shaped in a way to engage a drive shaft. The sleeve and the drive shaft being coaxial.

The present invention also provides a method for expanding or retracting an electric actuator through converting the rotational movement of a mobile assembly into a transitional movement alongside the longitudinal axis of the actuator with an engaging mean. The method comprises attaching a first end of the actuator to an implement at least by a mean of attachment, attaching a second end of the actuator to a vehicle at least by another mean of attachment and activating a motor to rotate a mobile assembly inside a stator assembly of the electric actuator. The rotation of the mobile assembly triggers a mobile counterpart to engage an inner part of the stator assembly of the electric actuator. The method further comprises converting the rotational movement of the mobile assembly into a transitional movement alongside the longitudinal axis of the actuator with an engaging mean.

In another aspect of the invention, the step of converting the rotational movement may further comprise using a reduced friction mechanism to convert the rotational movement of the mobile assembly into a transitional movement alongside the longitudinal axis of the actuator and to improve the mechanical resistance of the actuator.

In a further aspect of the invention, the motor may be connected to a gear box.

The step of converting the rotational movement may further comprise converting the rotational movement of the mobile assembly into a transitional movement alongside the longitudinal axis of the actuator using an internally threaded stator assembly of the actuator and a screw attached to the mobile assembly.

The step of converting the rotational movement may further comprise rolling balls engaging an internally grooved stator assembly of the actuator and an externally grooved counterpart attached to the mobile assembly to convert the rotational movement of the mobile assembly into a transitional movement alongside the longitudinal axis of the actuator and to ensure an important resistance to high loads.

In a further aspect of the invention, the method may further comprise engaging a threaded portion of the stator assembly to a threaded portion of the mobile assembly and engaging rolling balls to both a grooved inner part of the stator assembly and an externally grooved insert attached to the mobile counterpart.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which:

FIG. 7 is a perspective exploded view of two parts composing an electric actuator in accordance with the principles of the present invention.

DETAILED DESCRIPTION OF THE PREFERRED EMBODIMENT

A novel electric actuator will be described hereinafter. Although the invention is described in terms of specific illustrative embodiments, it is to be understood that the embodiments described herein are by way of example only and that the scope of the invention is not intended to be limited thereby.

In a preferred embodiment, the electric actuator is used to change the orientation of an implement comprising an enclosure for connecting the system to a vehicle or an implement comprising an engaging mean, such as but not limited to the enclosure being threaded or internally grooved. The electric actuator further comprises a mobile counterpart to engage the engaging mean for translating the rotational movement of the mobile counterpart into either a longitudinal movement along the longitudinal axis of the system or into a rotational movement of rolling balls inside a grooved part. In such an embodiment, a translational movement is induced by the rotational movement of the rolling balls alongside the longitudinal axis of the system. The electric actuator may further comprises an electric motor connected to the mobile counterpart for engaging the mobile counterpart and a second enclosure connected to the electric motor for connecting the system to said vehicle or said implement.

In other embodiments, the electric actuator may further comprise a gear box connected to the mobile assembly and to the electric motor for increasing the torque of the electric motor.

Figure 1:
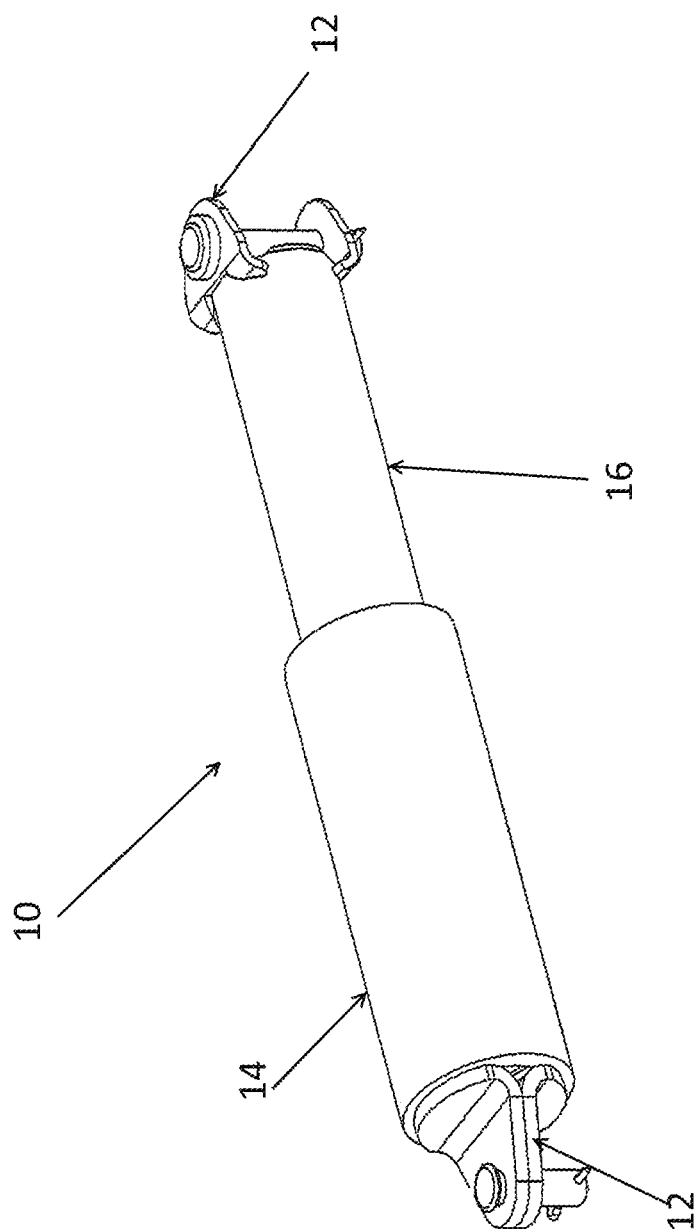
FIG. 1 is a perspective view of an electric actuator in accordance with the principles of the present invention.
Figure 2:
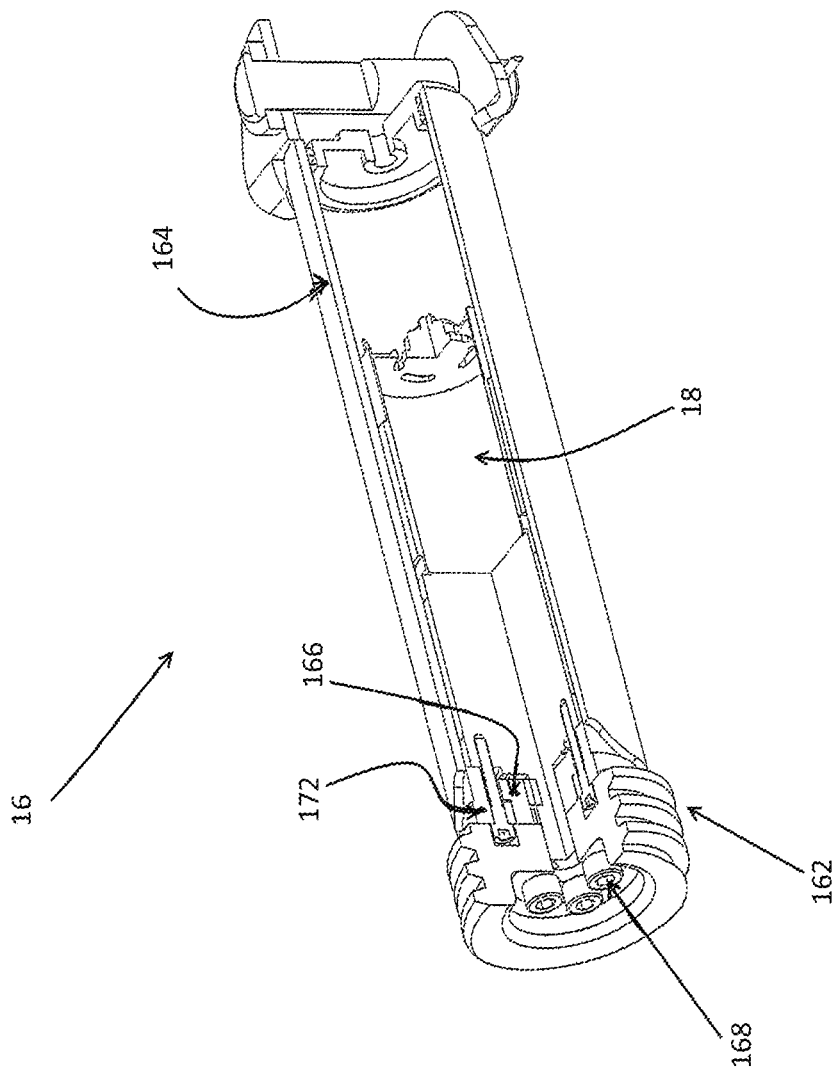
FIG. 2 is a sectional perspective view of a motor assembly in accordance with the principles of the present invention.

Now referring to FIG. 1, an embodiment of an electric actuator 10 typically used to connect a plow to a vehicle using an attachment device 12. The actuator 10 generally allows changing orientation of the implement with respect to a generally vertical axis. However, it is understood that the electric actuator 10 is not limited to be used with a plow. It could therefore support other types of implements such as, but not limited to, a snowblower or the likes. The electric actuator 10 is composed of two main parts: the stator assembly 14 and the motor assembly 16.

Now referring to FIGS. 2, 5, 10, 13 and 17, preferred embodiments of an electric actuator, comprising different engaging means, are shown. The motor assembly 16 typically comprises a moving counterpart 162, at one end of the motor assembly to be coupled to a sleeve 166 by means of fasteners 168, such as bolts. The sleeve is then coupled to an electric motor assembly 18 by means of a drive shaft 182 to induce rotation of the moving counterpart 162. The sleeve 166 comprises an aperture 190. Such aperture 190 is typically shaped in a way to engage the drive shaft 182 for limiting rotational movement of the said drive shaft with regard to the sleeve 166. The electric motor assembly 18 is substantially immobile with regard to the enclosure 164. The moving counterpart 162, the enclosure 164, the sleeve 166, and the drive shaft 182 all have a longitudinal axis. All of said axes are generally parallel.

Figure 8:
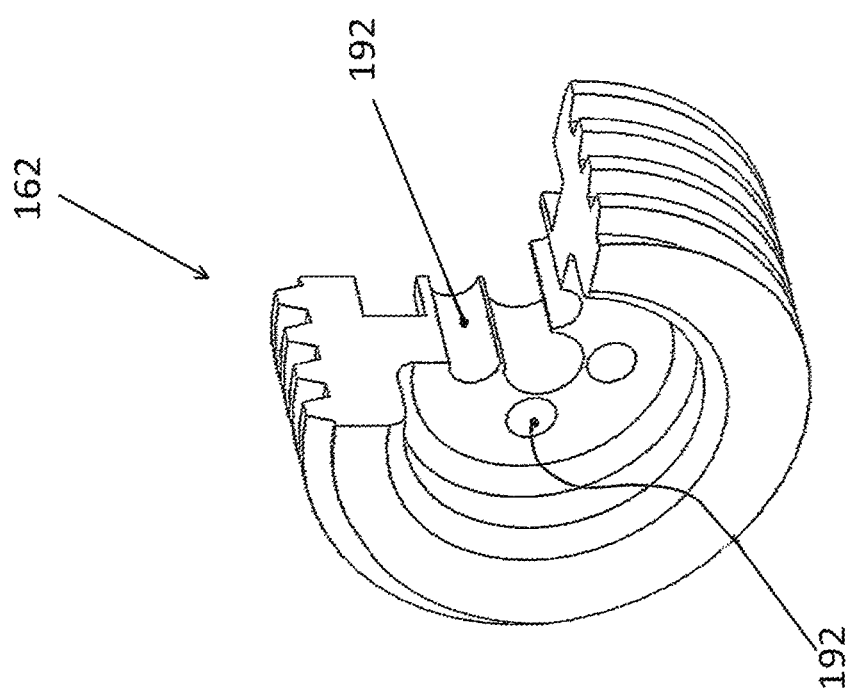
FIG. 8 is a sectional perspective view of a screw of an electric actuator in accordance with the principles of the present invention.
Figure 9:
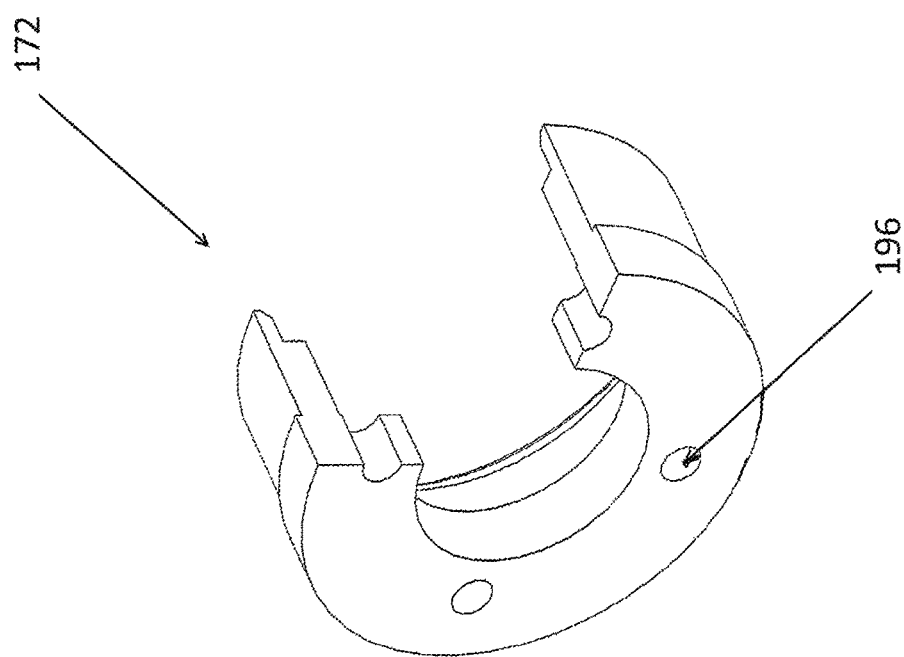
FIG. 9 is a sectional perspective view of a plate of an electric actuator in accordance with the principles of the present invention.
Figure 10:
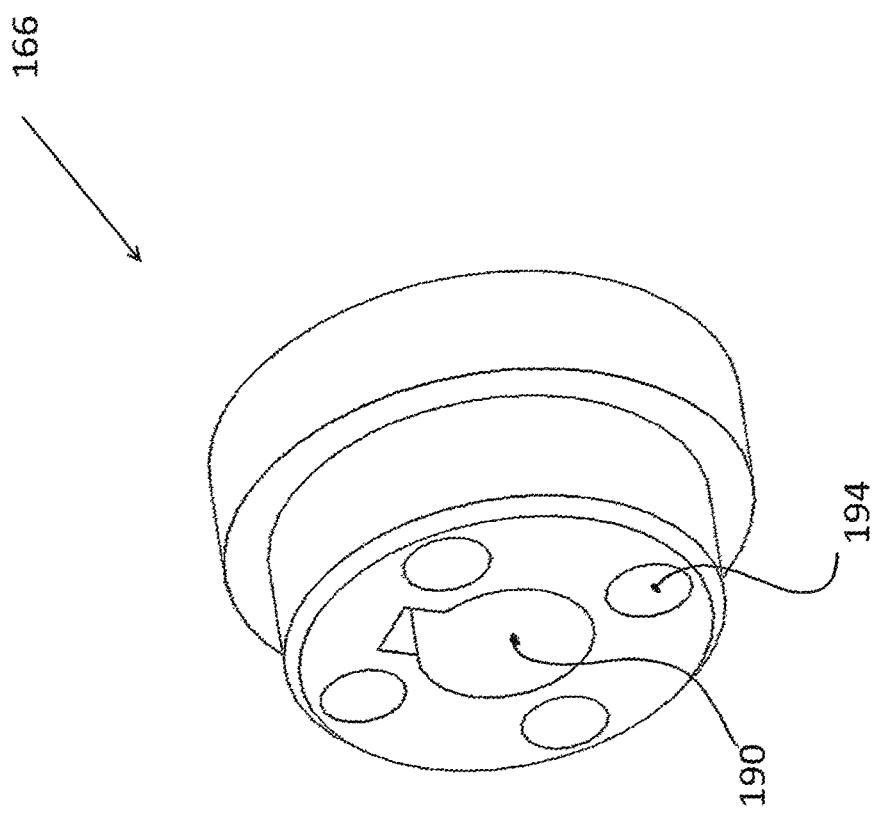
FIG. 10 is a sectional perspective view of a sleeve of an electric actuator in accordance with the principles of the present invention.

In some embodiments, the moving counterpart 162 is externally threaded, such as but not limited to a screw as shown in FIG. 8.

Figure 12:
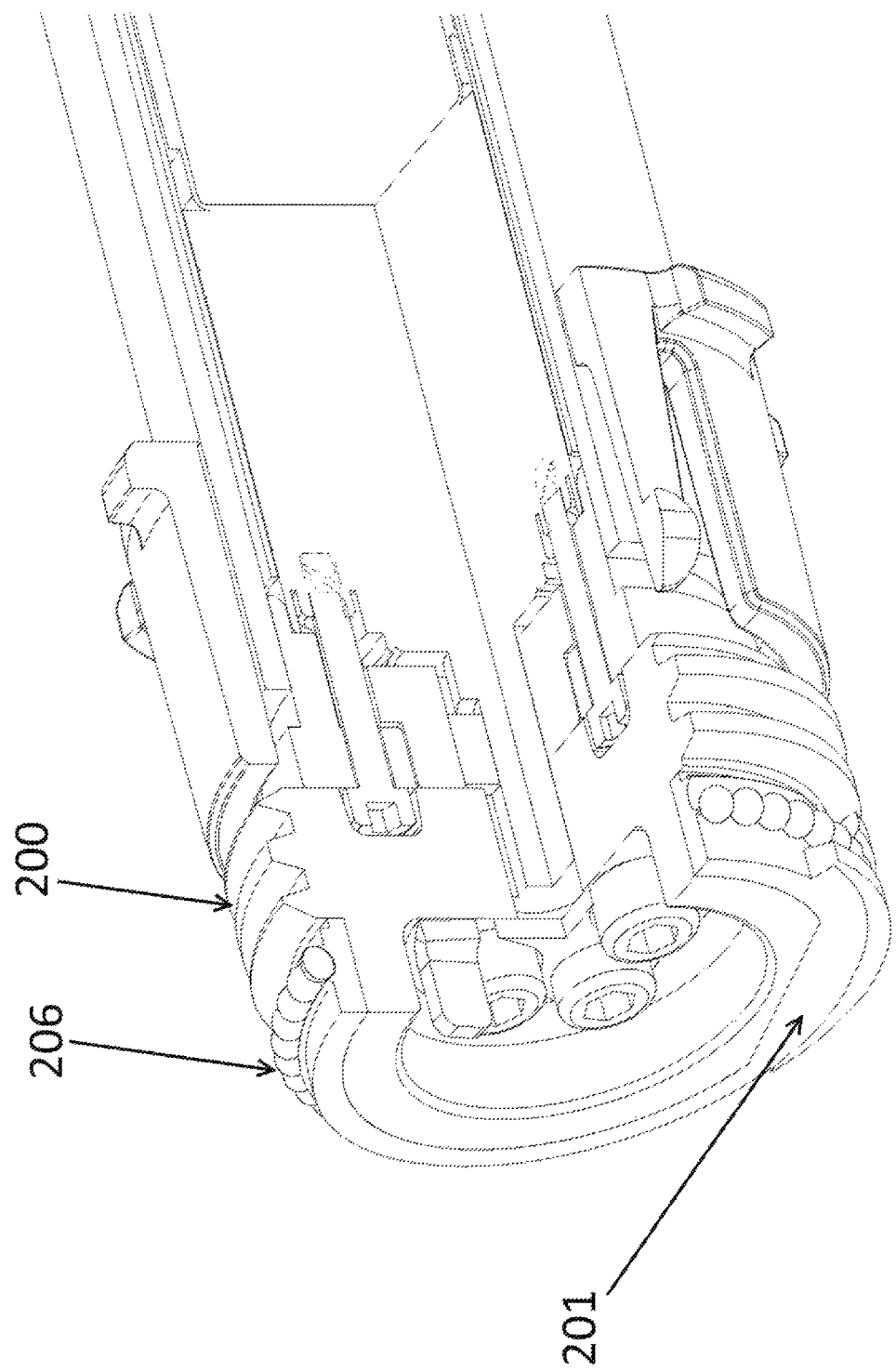
FIG. 12 is a close sectional perspective view of a threaded end of a second embodiment of the motor assembly in accordance with the principles of the present invention.
Figure 13:
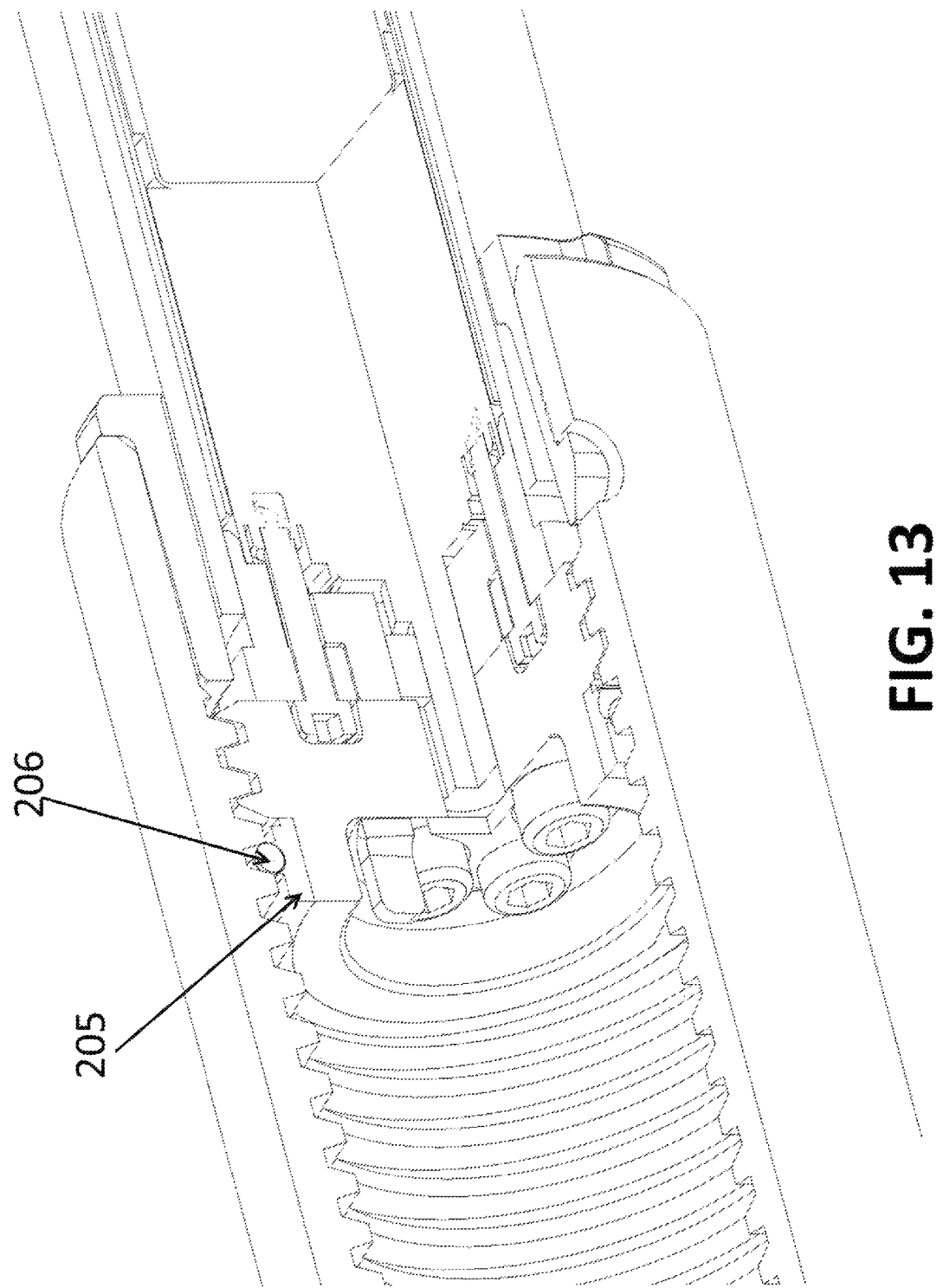
FIG. 13 is a close sectional perspective view of a portion of a second embodiment of an electric actuator shown in expanded position in accordance with the principles of the present invention.
Figure 14:
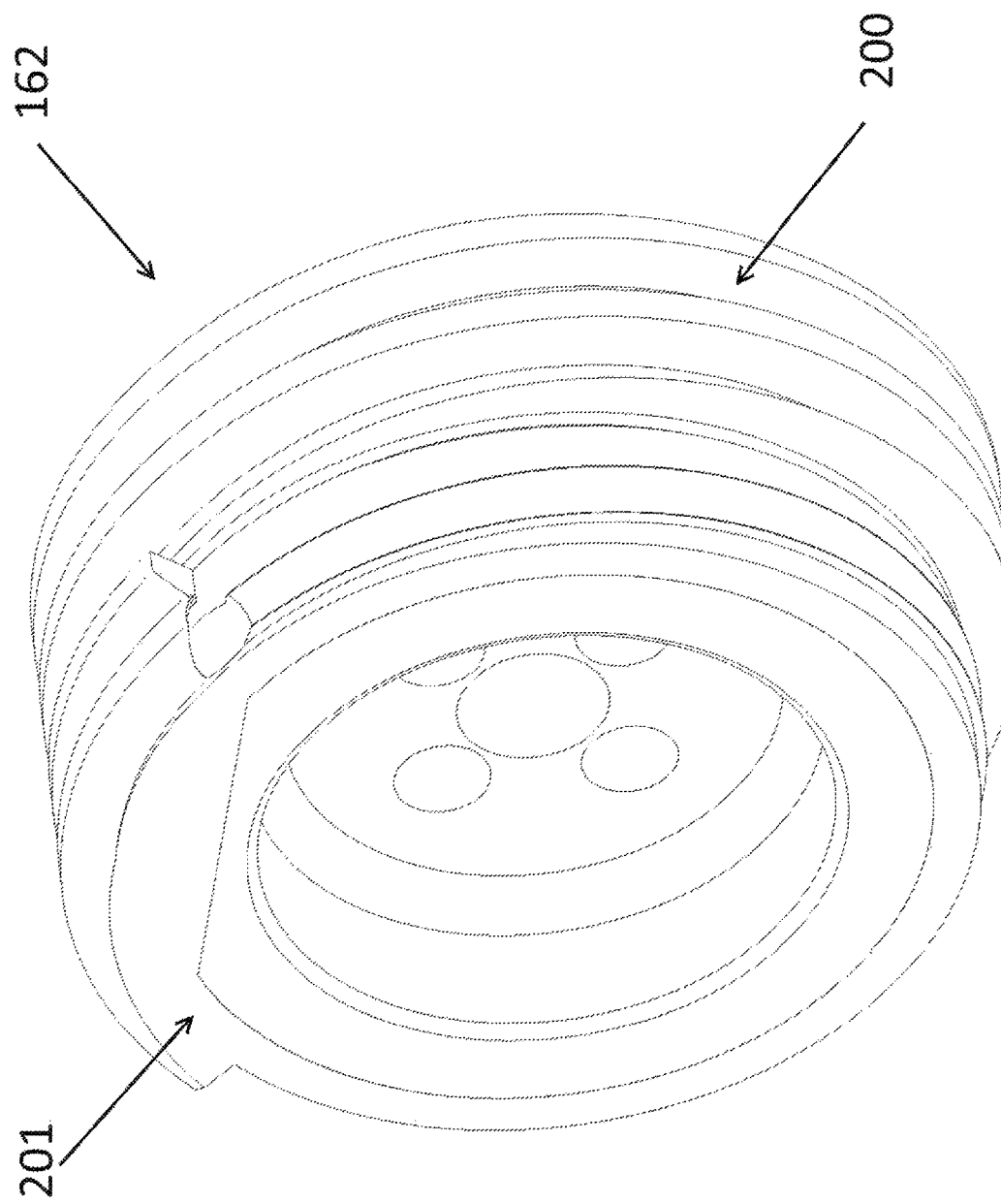
FIG. 14 is a perspective view of an exemplary grooved insert attached to a screw of an electric actuator in accordance with the principles of the present invention.
Figure 15:
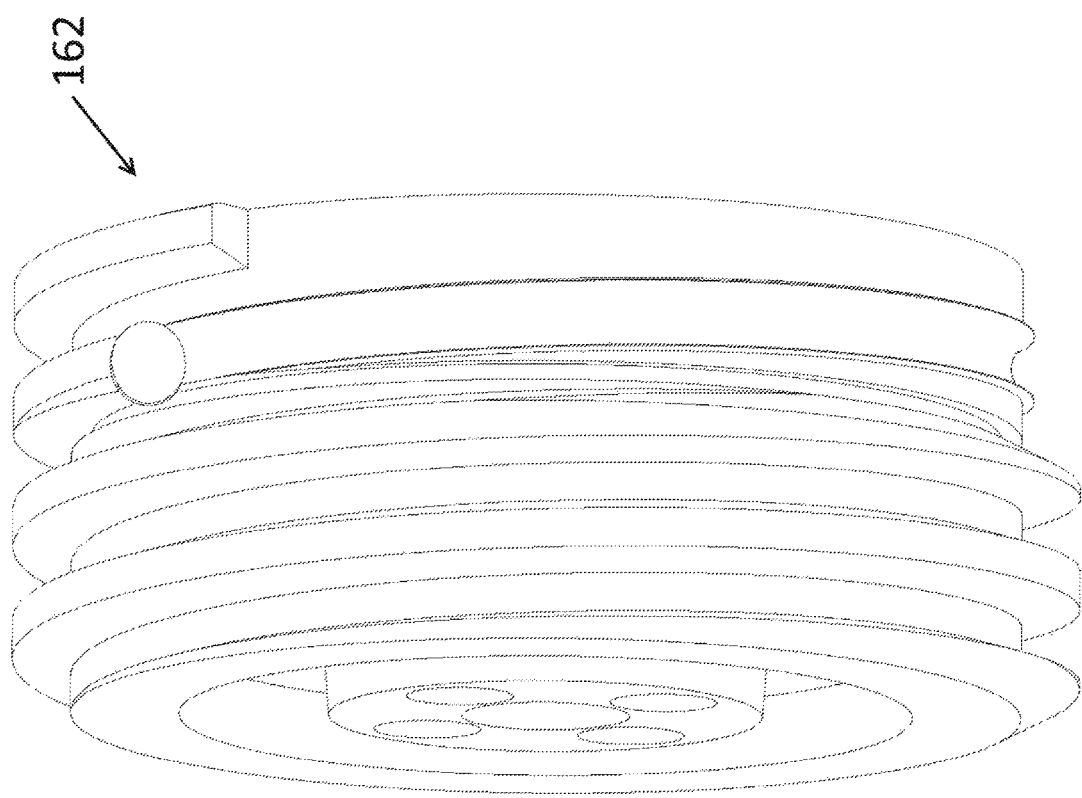
FIG. 15 is a perspective view of an exemplary screw having a specific grooved shape in accordance with the principles of the present invention.
Figure 16:
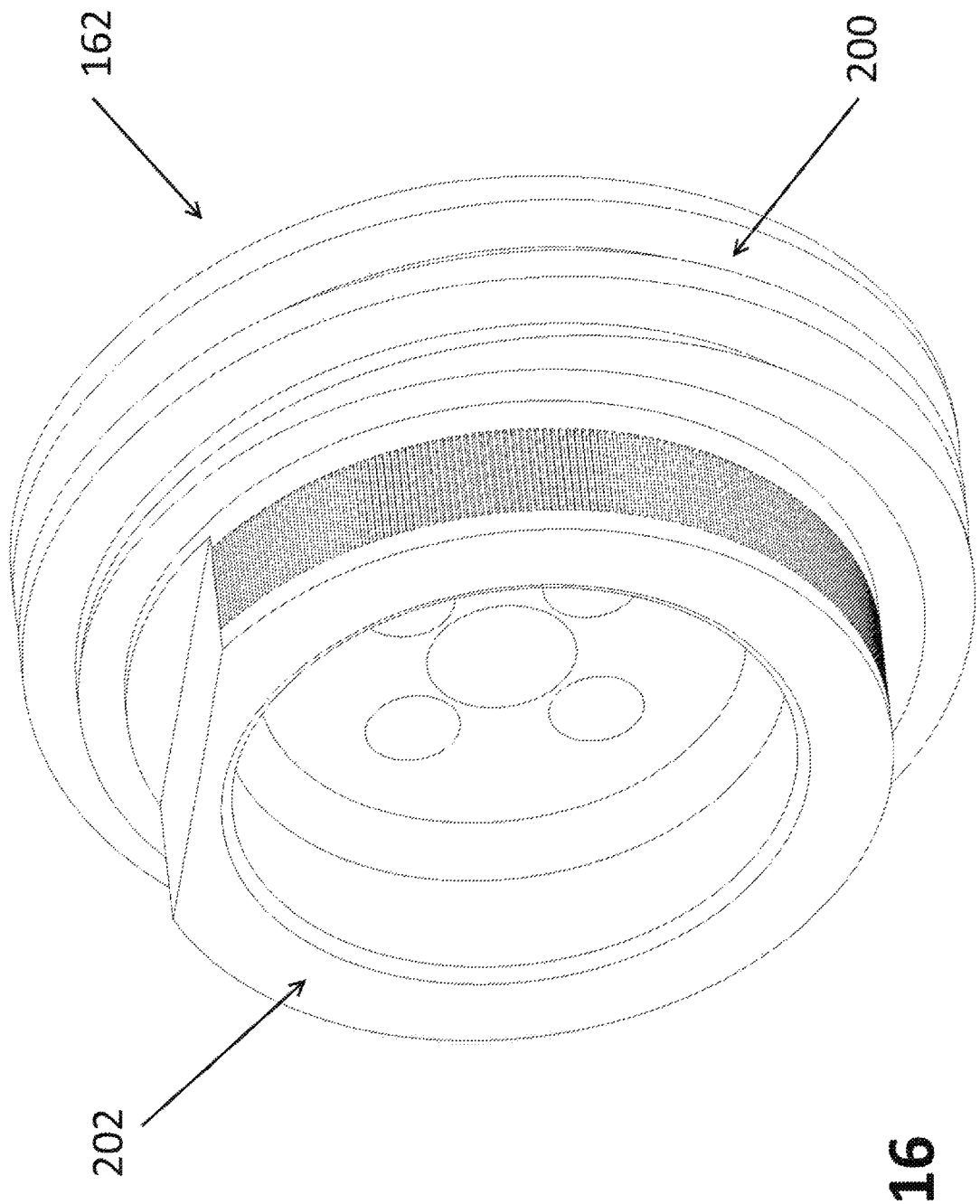
FIG. 16 is a perspective view of an exemplary grooved metallic insert attached to the screw in accordance with the principles of the present invention.

Now referring to FIGS. 14 to 16, some preferred embodiments of the moving counterpart 162 are shown. The FIG. 14 shows a moving counterpart 162 comprising two majors portions: preferably but not limited to, a plastic insert 201 injected on the end of a threaded part 200. The insert 201 is adapted to host rolling balls 206 as shown on FIG. 12. Such a configuration aims at reducing internal friction and aims at improving the force transmitted by the motor to the actuator. The insert 201 is deformed during an impact without being damaged and without damaging the rolling balls, thus creating a resilient force. Now referring to FIG. 16, an embodiment of the moving counterpart 162 is shown. In such an embodiment, the counterpart 162 comprises a preferred metallic insert 202 attached to the end of a threaded portion 200. The insert 202 is adapted to host rolling balls 206 or any other type of limited friction rolling mechanism.

Now referring to the FIG. 15, the moving counterpart 162 is an externally grooved part 207 adapted to receive the reduced friction rolling mechanism or rolling balls 206. Such an embodiment aims at supporting high loads.

Figure 4:
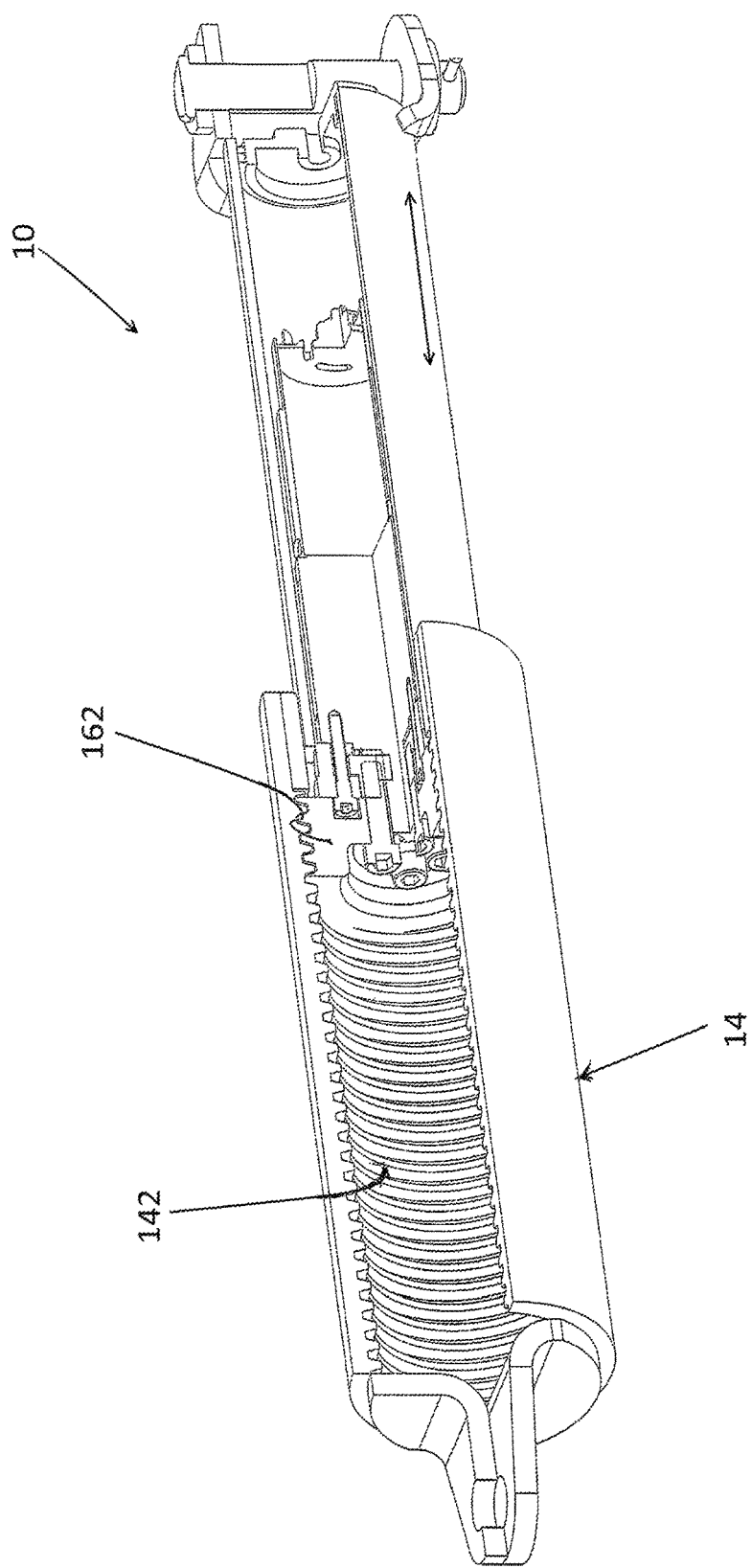
FIG. 4 is a sectional perspective view of an electric actuator shown in expanded position in accordance with the principles of the present invention.
Figure 5:
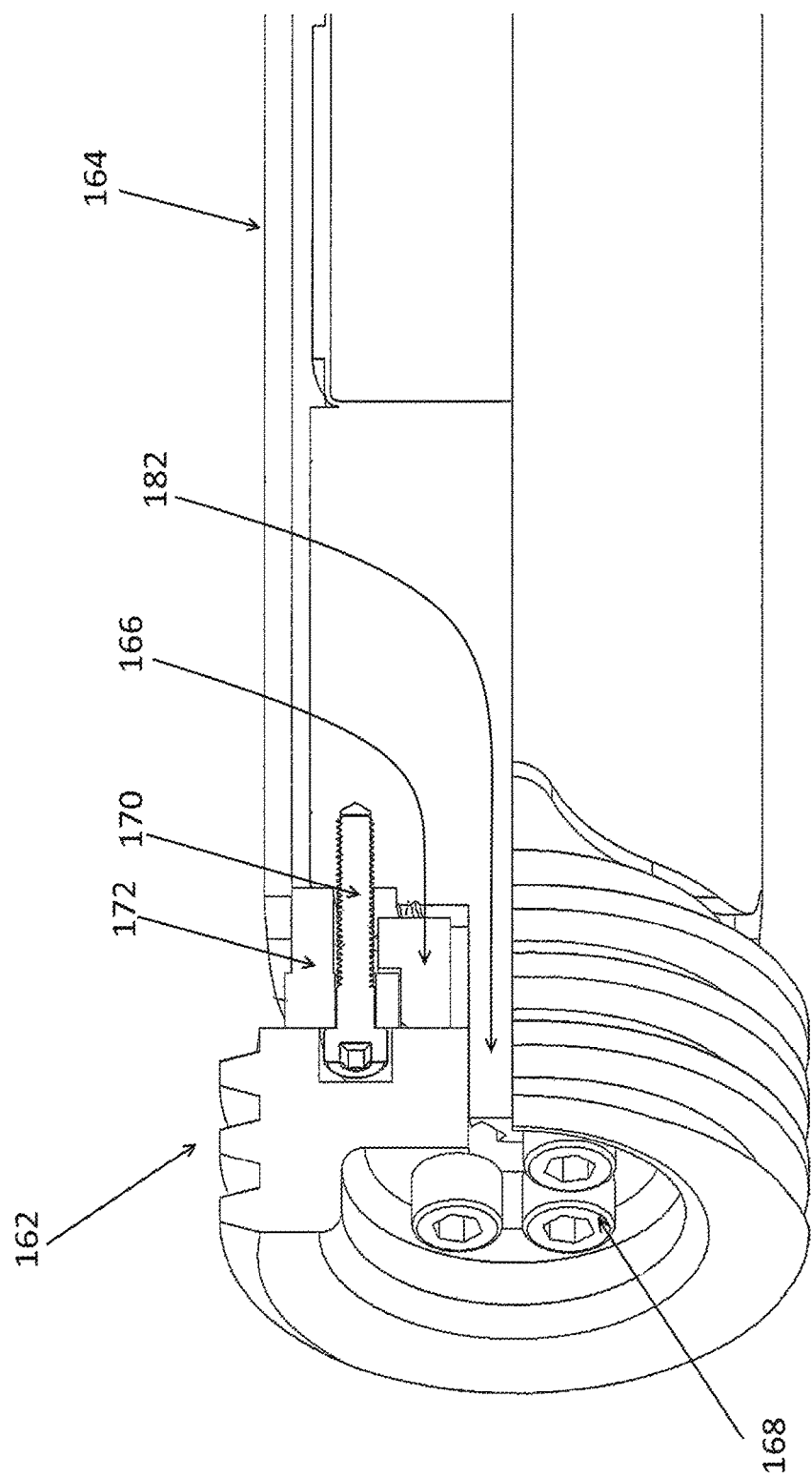
FIG. 5 is a close sectional perspective view of a threaded end of the motor assembly in accordance with the principles of the present invention.
Figure 11:
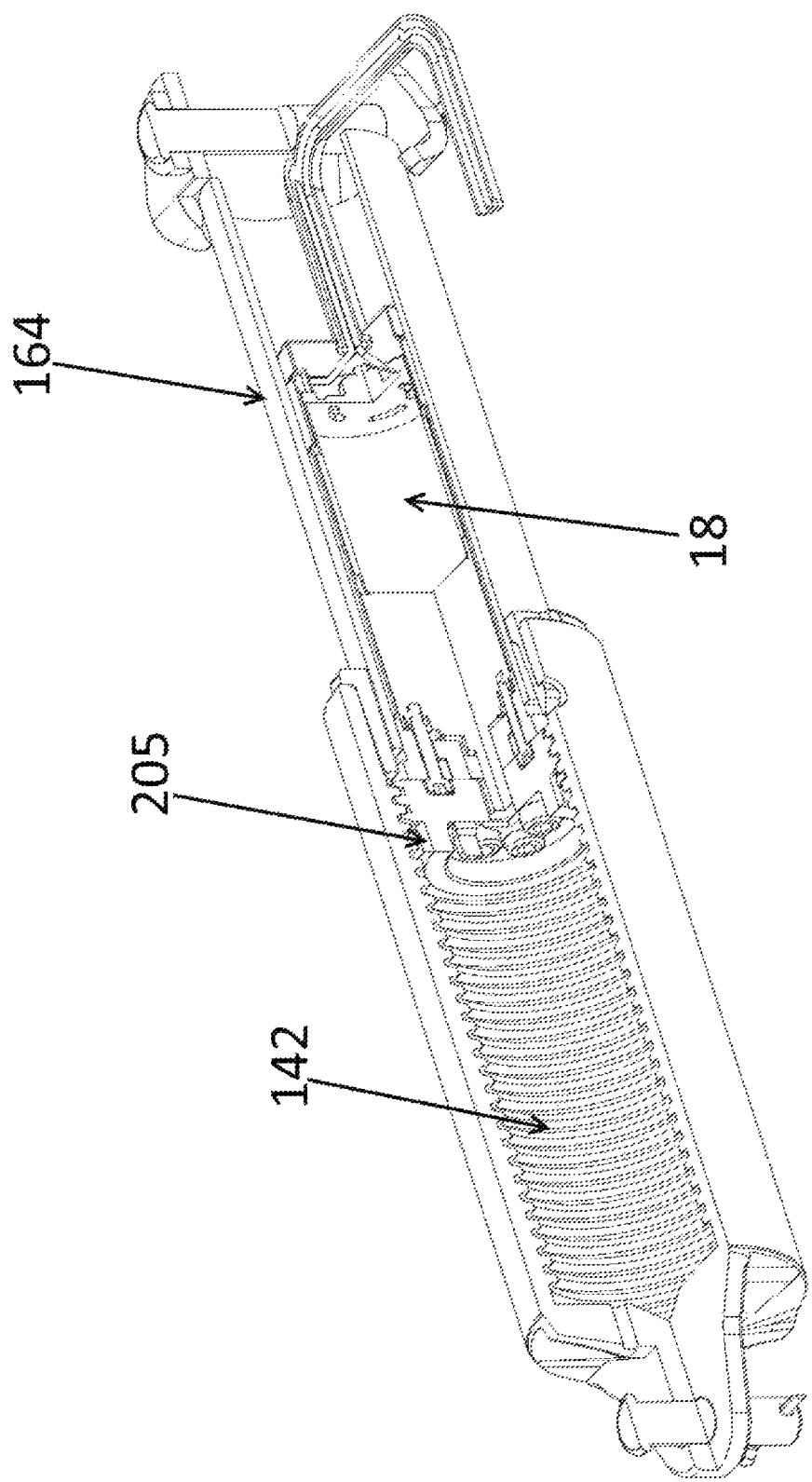
FIG. 11 is a sectional perspective view of a second embodiment of an electric actuator shown in expanded position in accordance with the principles of the present invention.
Figure 17:
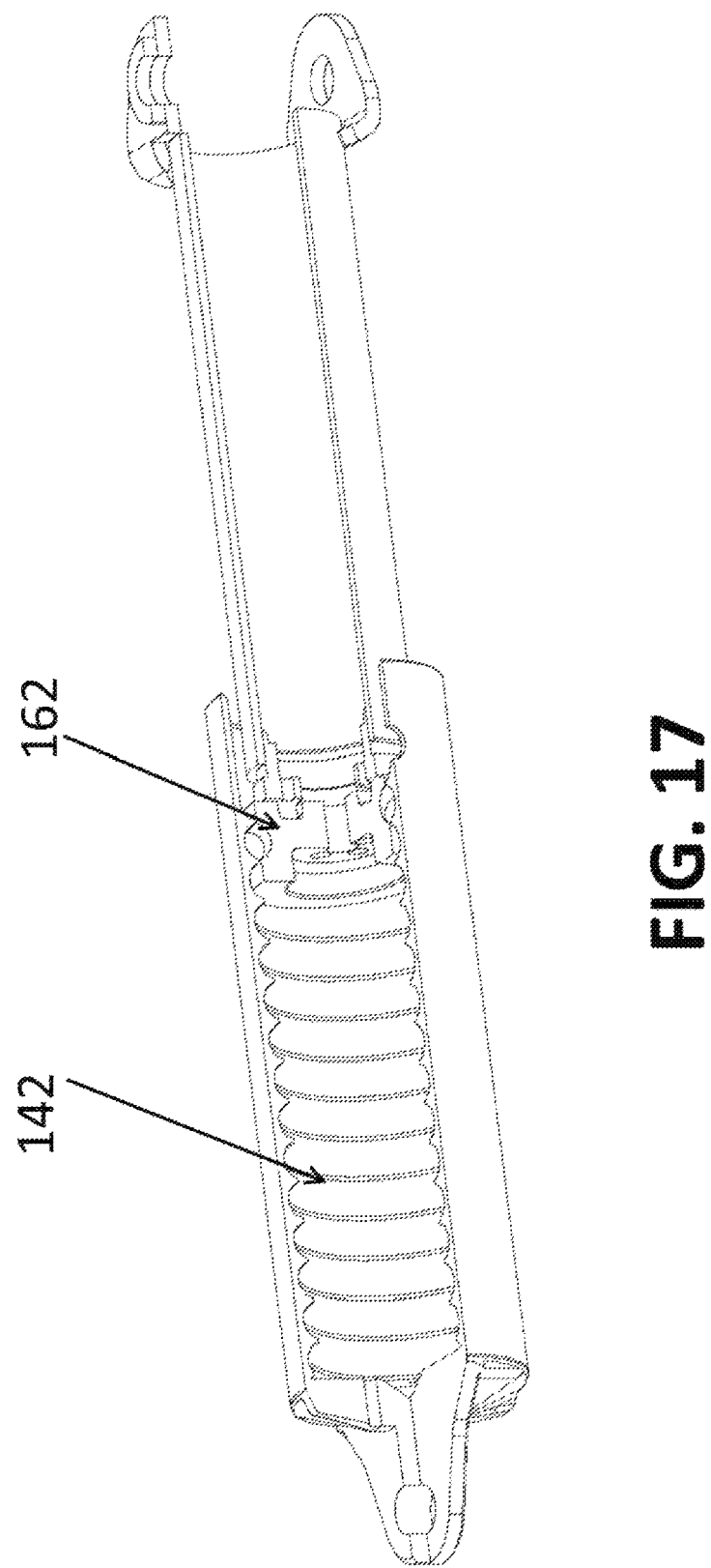
FIG. 17 is a sectional perspective view of a third embodiment of an electric actuator shown in expanded position in accordance with the principles of the present invention.

Now referring to FIGS. 4, 11 and 17, different shapes of the interior surface 142 of the stator assembly 14 are shown. In the presented embodiments, the interior surface 142 is adapted in a way to engage, by different possible means, the moving counterpart 162 of the motor assembly 16. Thus, the FIG. 4 shows the interior surface 142 engaging a totally threaded moving counterpart 162, such as but not limited to a screw. The FIG. 11 shows the interior surface 142 engaging a moving counterpart 162 which comprises an insert 205 grooved in a way to receive a reduced friction mechanisms such as rolling balls and attached at the end of a threaded portion 200. Now referring to FIG. 17, both, the interior wall 142 and the moving counterpart 162 are grooved in a way to receive rolling balls 206. One skilled in the art shall understand that any other way to engage the moving counterpart 162 to the interior surface 142 may be used.

The powering of the electric motor 186 of the electric motor assembly 18 may be triggered using any type of interface. In a preferred embodiment, a button wired to the electric motor 186 is used to trigger the electric motor 186. In other embodiments, the motor assembly may comprise a module to be remotely activated using any type of communication method, such as a RF remote controller and/or a portable device such as a smart phone, tablet or computer. The main advantage resides in the fact that the operator will not have to quit the vehicle to turn the implement. Also, the system is simple and only needs a small electric motor to be activated, thus reducing the weight of the system.

Figure 3:
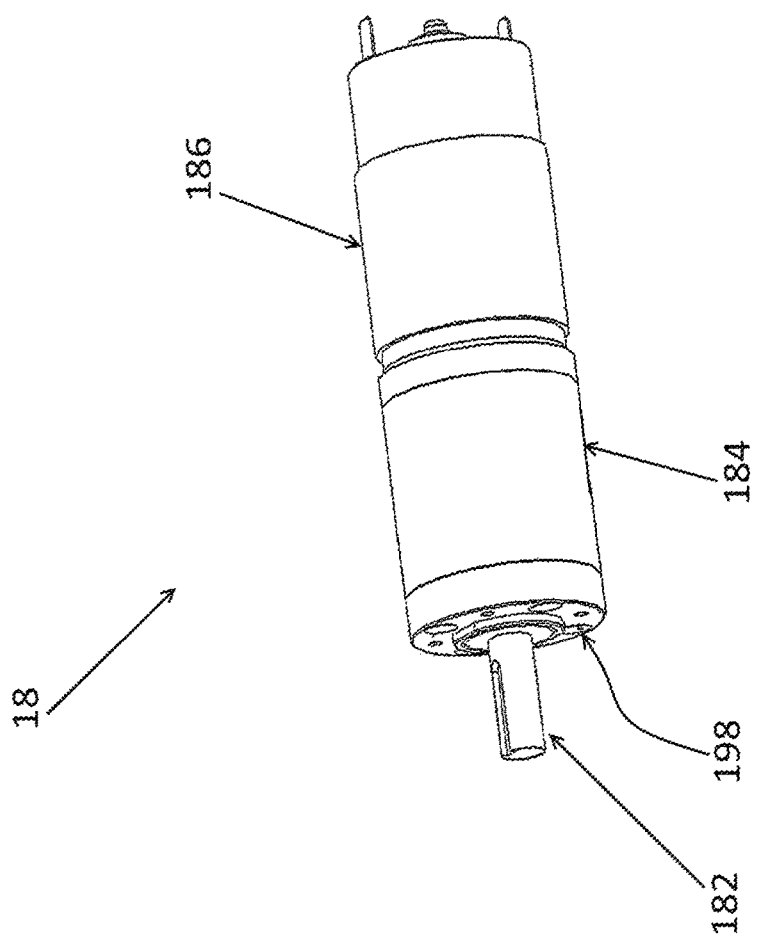
FIG. 3 is a perspective view of an electric motor assembly in accordance with the principles of the present invention.

Now referring back to FIG. 3, it is noted that the size of the electric motor assembly 18 is limited by the size of actuator 10. In a preferred embodiment, a gearbox 184 could be connected to the electric motor 186 to reduce the final angular velocity of the drive shaft while significantly increasing the available torque of the electric motor assembly 18. The gearbox 184 uses common technology known in the art such as, but not limited to, planetary gears.

Now referring to FIGS. 3, 5, 13 and 7-10, the moving counterpart 162 is attached to the sleeve 166 to trap the plate 172 between the moving counterpart 162 and the sleeve 166, aiming at limiting translational movement of the moving counterpart 162 with regard to the enclosure 164 alongside the longitudinal axis of the enclosure 164. In the present embodiment, the moving counterpart 162 is attached to the sleeve 166 using fasteners 168 and the plate 172 is attached to the enclosure 164. The fasteners 168 are screwed through holes 192 of the moving counterpart 162 and through holes 194 of the sleeve 166. The sleeve 166 and the moving counterpart 162 are thus able to rotate independently from the enclosure 164 about its longitudinal axis. The electric motor assembly 18 is substantially static with regard to the enclosure 164. In the present embodiment, bolts 170 are used to attach said electric motor assembly to the plate 172 but any other attachment means known in the art may be used. The bolts 170 are screwed through holes 196 of the plate 172 and through holes 198 of the electric motor assembly 18.

In a preferred embodiment, actuation of the electric motor 186 of the electric motor assembly 18 induces rotation of the drive shaft 182 thus forcing the sleeve 166 and the moving counterpart 162 to rotate inside the stator assembly 14. The rotatory movement is then transformed in a translational movement alongside the longitudinal axis of the actuator 10. In some embodiment, the translation movement is transformed:
  i. either by the two communicating threaded parts of 162 and 142 as shown on FIG. 4;
  ii. either by the grooved interior wall 142 and the rolling balls 206 hosted by a grooved counterpart 162 as shown on FIG. 17;
  iii. by two communicating threaded parts of 162 and 142 and the movement of the rolling balls inside a grooved insert supported by the counterpart 162.

Figure 6:
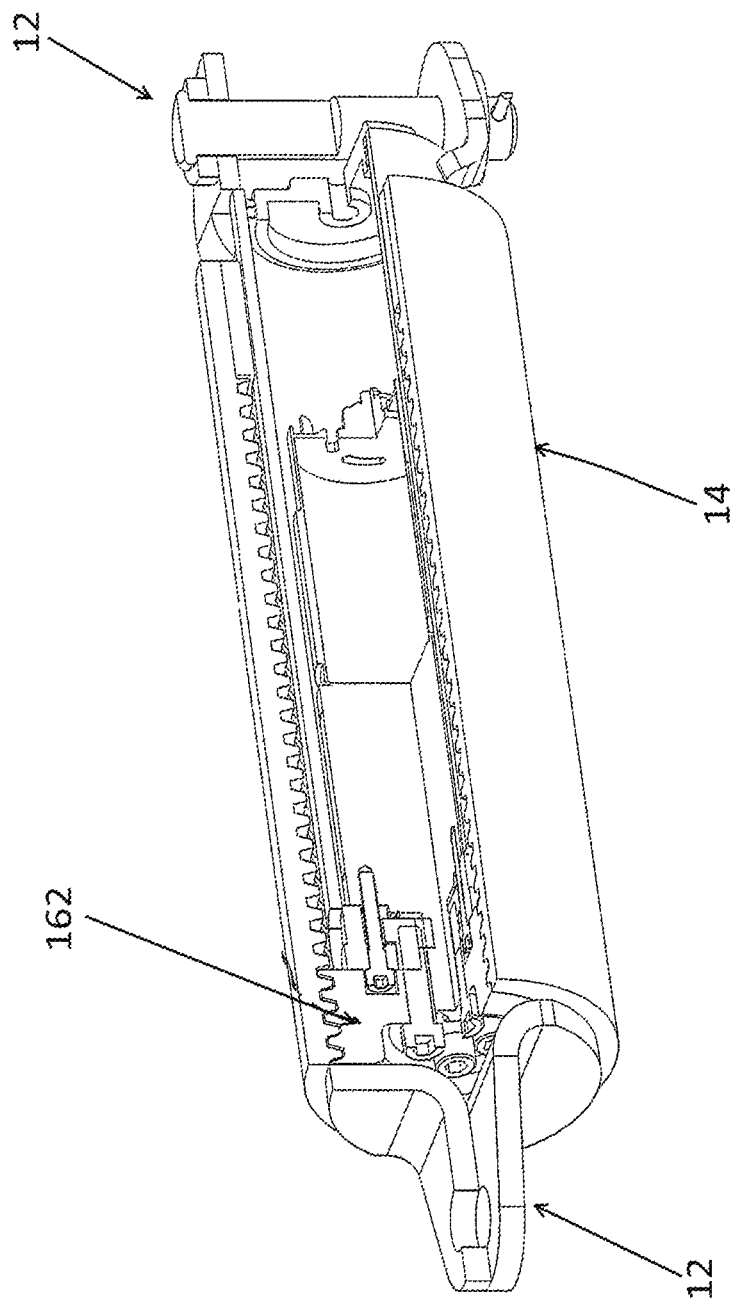
FIG. 6 is a sectional perspective view of the electric actuator of FIG. 1 shown in retracted position.

The translational movement alongside the longitudinal axis of the actuator 10 causes the electric actuator 10 to expand or retract depending on the rotating direction of the electric motor 186 (see arrows on FIG. 4). The fully expended and retracted actuators are illustrated in FIGS. 4 and 6, respectively.

The scope of the claims should not be limited by the preferred embodiments set forth in the examples, but should be given the broadest interpretation consistent with the description as a whole.

What is claimed is:

1. An electric actuator for changing the orientation of an implement relative to a frame of a vehicle, the electric actuator comprising:
  a stator assembly having a hollow cylindrical body with an open end, the stator assembly having a first attachment device connected to the cylindrical body for attaching the electric actuator to one of the frame of the vehicle and the implement, the stator assembly having a cylindrical inner wall defining a first helical groove; and
  a motor assembly movably engaged to the stator assembly for extending or retracting the electric actuator, the motor assembly including:
    a cylindrical enclosure inserted in the open end of the hollow cylindrical body of the stator assembly, the cylindrical enclosure having a second attachment device for attaching the electric actuator to another one of the frame of the vehicle and the implement, an electric motor received inside the cylindrical enclosure, the electric motor being at least indirectly connected to the cylindrical enclosure,
a rotatable drive shaft at least indirectly connected to the electric motor;
a sleeve at least partially received inside the cylindrical enclosure;
a mobile counterpart received in the hollow cylindrical body of the stator assembly and at least indirectly connected to the drive shaft, the mobile counterpart being rotatable inside the hollow cylindrical body of the stator assembly when the electric motor is activated, the mobile counterpart having a cylindrical outer wall defining a second helical groove complementary to the first helical groove of the stator assembly;
a plate disposed at least in part between the mobile counterpart and the sleeve, the plate being connected to the cylindrical enclosure and to the electric motor; and
an assembly of rolling balls disposed radially between the mobile counterpart and the stator assembly, the assembly of rolling balls being received in the first and second helical grooves defined by the stator assembly and the mobile counterpart;
whereby rotation of the mobile counterpart moves the assembly of rolling balls in the first and second helical grooves, and moves the motor assembly relative to the stator assembly, thereby extending or retracting the electric actuator, the plate limiting the movement of the mobile counterpart with regard to the cylindrical enclosure.

2. The electric actuator of claim 1, wherein the sleeve defines an aperture through which the drive shaft extends, the sleeve being rotationally fixed to the drive shaft, and the mobile counterpart being connected to the sleeve.

3. The electric actuator of claim 2, wherein the mobile counterpart is connected to the sleeve via at least one fastener.

4. The electric actuator of claim 1, further comprising a gear box received in the enclosure, and operatively connected between the electric motor and the drive shaft.

5. The electric actuator of claim 1, wherein the plate is connected to the electric motor via at least one fastener.

6. The electric actuator of claim 1, wherein the plate is connected to the electric motor via a plurality of fasteners.

* * * * *